United States Patent Office 2,823,096
Patented Feb. 11, 1958

2,823,096
PROCESS FOR RECOVERING GALLIUM FROM ITS ORES

Ludo K. Frevel and Joseph T. Kummer, Midland, Mich., assignors to The Dow Chemical Company, Midland, Mich., a corporation of Delaware No Drawing. Application March 15, 1956
Serial No. 571,604

3 Claims. (Cl. 23—16)

This invention relates to a process for separating gallium from ores containing it. More particularly, it relates to a process for separating gallium from ores containing it by subjecting the subdivided ore to a current of hydrogen chloride or hydrogen bromide at an elevated temperature under substantially anhydrous conditions and recovering the gallium as its trichloride or tribromide in concentrated form.

It has now been discovered, in accordance with this invention, that gallium can be separated from ores containing it by subjecting the subdivided ore at an elevated temperature ranging from about 700° C. to about 950° C. to a current of hydrogen chloride or hydrogen bromide under substantially anhydrous conditions, the hydrogen chloride or hydrogen bromide being present in amount sufficient to volatilize substantially all of the gallium present, as determined by X-ray fluorescence, i. e., less than 0.001%. At the same time, heavy metals such as iron and zinc are also volatilized in varying amounts as chlorides or bromides, and these are condensed together with the gallium trihalide, dissovled in water, and separated from the gallium trichloride as by precipitation with aqueous sodium hydroxide to form their hydroxides and to form soluble sodium gallate. The caustic solution of sodium gallate is thereafter separated from the precipitate and electrolyzed in known manner to deposit metallic gallium.

The following example and table, in which parts and percentages are by weight, illustrate preferred embodiments of the invention. In each case, a quartz tube reactor was charged with subdivided ore and heated to the indicated temperature before starting the flow of gaseous hydrogen chloride or hydrogen bromide. The halides thereby volatilized were condensed at atmospheric pressure to a solid in a tube condenser following the quartz tube reactor and to a liquid hydrochloric acid solution of a lesser amount of metal halides in a receiver following the tube condenser.

EXAMPLE I

A 20 gram sample of pelletized Puralox (gamma-alumina) was treated for two hours at 950° C. with anhydrous hydrogen chloride (ca. 140 ml./min. at 25° C., 1 atm.), and the solid condensed extract was collected and analyzed by X-ray fluorescence. After treatment with hydrogen chloride, the Puralox was found to be free of gallium whereas before treatment the gallium content was 0.010±0.002 percent.

Granular fluorite, Georgia bauxite, Arkansas bauxite and Puralox were reacted with anhydrous hydrogen chloride at 900° C. using an HCl flow rate of ca. 0.02 gram HCl per gram of ore per minute. It was found that a reaction time of one hour, under such conditions quantitatively removed gallium from such ores. The following Table I shows results for these and other reaction times. Reaction times in excess of one hour at 900° C. removed larger quantities of accompanying heavy metals.

Table I
REMOVAL OF GALLIUM FROM ORES WITH ANHYDROUS HCl
T=900° C.
Flow Rate of HCl=0.02 g./g.ore/minute.

| Ore | Reaction Time, Hrs. | Percent Gallium | |
|---|---|---|---|
| | | Before Reaction | After Reaction |
| Fluorite | 2 | 0.008 | (*) |
| Georgia Bauxite | 3 | 0.008 | (*) |
| Arkansas Bauxite | 6 | 0.008 | (*) |
| Puralox | 1 | 0.010 | (*) |

*Gallium not detectable by X-ray fluorescence.

The present invention provides a ready and economic process for recovering gallium from ores containing it by volatilizing the gallium as trichloride or tribromide by reaction between a subdivided ore and a stream of hydrogen chloride or hydrogen bromide under substantially anhydrous conditions at temperatures ranging from about 700° C. to about 950° C. Varying amounts of associated heavy metals simultaneously volatilized thereby are separated from the gallium chloride such as by treatment with aqueous NaOH to precipitate heavy metals as their hydroxides and to form a soluble sodium gallate. The precipitate is thereafter filtered off and the gallium is recovered by electrolysis of the alkaline sodium gallate solution in known manner.

What is claimed is:

1. In a method for separating gallium from ores containing it, the step which comprises treating the subdivided ore with a current of a hydrogen halide of the group consisting of hydrogen chloride and hydrogen bromide under substantially anhydrous conditions at a temperature ranging from about 700° C. to about 950° C. in amount sufficient to volatilize the gallium as gallium trihalide.

2. A method for recovering gallium from ores containing it, which comprises treating the subdivided ore with a current of a hydrogen halide of the group consisting of hydrogen chloride and hydrogen bromide under substantially anhydrous conditions at a temperature ranging from about 700° C. to about 950° C. in amount sufficient to volatilize the gallium as gallium trihalide and condensing and recovering said gallium trihalide in concentrated form.

3. Method of claim 2 in which the hydrogen halide is hydrogen chloride.

References Cited in the file of this patent
UNITED STATES PATENTS

| 2,020,431 | Osborne et al. | Nov. 12, 1935 |
| 2,378,675 | Agnew et al. | June 19, 1945 |

OTHER REFERENCES

J. W. Mellor's "A comprehensive Treatise on Inorganic and Theoretical Chemistry," vol. 5, 1924 ed., pages 383, 384; Lonmans, Green and Co., New York.

"General Chem.," by McPherson and Henderson, third ed. (1927), page 572; Ginn and Co., New York.